(12) United States Patent
Sartorius

(10) Patent No.: US 11,970,272 B2
(45) Date of Patent: Apr. 30, 2024

(54) ANTHROPOMORPHIC CARGO SYSTEM

(71) Applicant: The Boeing Company, Chicago, IL (US)

(72) Inventor: Thomas Skyler Sartorius, San Luis Obispo, CA (US)

(73) Assignee: The Boeing Company, Arlington, VA (US)

( * ) Notice: Subject to any disclaimer, the term of this patent is extended or adjusted under 35 U.S.C. 154(b) by 103 days.

(21) Appl. No.: 17/965,036

(22) Filed: Oct. 13, 2022

(65) Prior Publication Data

US 2023/0133448 A1 May 4, 2023

Related U.S. Application Data

(60) Provisional application No. 63/274,620, filed on Nov. 2, 2021.

(51) Int. Cl.
*B64D 11/06* (2006.01)
(52) U.S. Cl.
CPC ........ *B64D 11/0627* (2014.12); *B64D 11/064* (2014.12)
(58) Field of Classification Search
CPC .......................... B64D 11/064; B64D 11/0627
See application file for complete search history.

(56) References Cited

U.S. PATENT DOCUMENTS

2019/0352087 A1* 11/2019 Williams ................ B60R 7/043
2023/0115357 A1* 4/2023 Ward .................. B64D 11/0627
224/275

* cited by examiner

*Primary Examiner* — Tye William Abell
(74) *Attorney, Agent, or Firm* — McDonnell Boehnen Hulbert & Berghoff LLP

(57) ABSTRACT

In an example, a cargo system for storage in a seating area of an aircraft is described. The cargo system includes a plurality of storage containers including a first container operably connected to a second container via at least one connector. The connector(s) is/are configured to allow relative movement of the first container to the second container between a first and second position. Based on the first container being in the first position, the plurality of storage containers are in a stacked arrangement in which the second container supports the first container. And based on the first container being in the second position, the plurality of storage containers are in a seated arrangement in which (i) the first container is positioned relative to the second container and configured to sit on a passenger seat in an aircraft and (ii) the second container abuts or sits adjacent to the passenger seat.

20 Claims, 4 Drawing Sheets

200 ↘

┌─────────────────────────────────────────────────────────────────────────────┐
│ MOVE A CARGO SYSTEM TO A LOCATION ADJACENT TO A PASSENGER SEAT IN AN AIRCRAFT, WHERE │
│ THE CARGO SYSTEM COMPRISES A PLURALITY OF STORAGE CONTAINERS COMPRISING A FIRST │
│ STORAGE CONTAINER OPERABLY CONNECTED TO A SECOND STORAGE CONTAINER VIA AT LEAST ONE │
│ CONNECTOR, WHERE THE AT LEAST ONE CONNECTOR IS CONFIGURED TO ALLOW RELATIVE MOVEMENT │
│ OF THE FIRST STORAGE CONTAINER TO THE SECOND STORAGE CONTAINER BETWEEN A FIRST │
│ POSITION AND A SECOND POSITION, WHERE THE CARGO SYSTEM IS MOVED TO THE LOCATION WHILE │ ~ 202
│ THE FIRST STORAGE CONTAINER IS IN THE FIRST POSITION, AND WHERE BASED ON THE FIRST │
│ STORAGE CONTAINER BEING IN THE FIRST POSITION, THE PLURALITY OF STORAGE CONTAINERS ARE IN │
│ A STACKED ARRANGEMENT IN WHICH THE SECOND STORAGE CONTAINER SUPPORTS THE FIRST │
│ STORAGE CONTAINER │
└─────────────────────────────────────────────────────────────────────────────┘
                                        ↓
┌─────────────────────────────────────────────────────────────────────────────┐
│ AT THE LOCATION, MOVE THE FIRST STORAGE CONTAINER TO THE SECOND POSITION, WHERE BASED │
│ ON THE FIRST STORAGE CONTAINER BEING IN THE SECOND POSITION, THE PLURALITY OF STORAGE │
│ CONTAINERS ARE IN A SEATED ARRANGEMENT IN WHICH (I) THE FIRST STORAGE CONTAINER IS │
│ POSITIONED RELATIVE TO THE SECOND STORAGE CONTAINER AND CONFIGURED TO SIT ON A │ ~ 204
│ PASSENGER SEAT IN AN AIRCRAFT AND (II) THE SECOND STORAGE CONTAINER IS CONFIGURED TO │
│ ABUT OR SIT ADJACENT TO THE PASSENGER SEAT. │
└─────────────────────────────────────────────────────────────────────────────┘

FIG. 7

ANTHROPOMORPHIC CARGO SYSTEM

CROSS-REFERENCE TO RELATED APPLICATIONS

The present disclosure claims priority to U.S. Provisional Application No. 63/274,620, filed on Nov. 2, 2021, the entire contents of which are herein incorporated by reference.

FIELD

The present disclosure relates generally to cargo containers for air travel, and more particularly, to an anthropomorphic cargo system for storage on an aircraft.

BACKGROUND

Empty seats on an aircraft such as a commercial aircraft can represent a major lost revenue opportunity and an undesirable expense of resources. Such negative effects can be even greater for smaller aircraft, where a single unexpectedly empty seat can have a large impact on the profitability of a flight. Smaller aircraft and airlines, as well as charter operators, can be important for providing services to smaller and isolated communities, and low profitability is particularly undesirable with such entities.

Thus, what is needed is a solution to reduce or eliminate lost revenue from empty seats on passenger aircraft.

SUMMARY

In an example, a cargo system for storage in a seating area of an aircraft is described. The cargo system includes a plurality of storage containers. The plurality of storage containers include a first storage container operably connected to a second storage container via at least one connector. The at least one connector is configured to allow relative movement of the first storage container to the second storage container between a first position and a second position. Based on the first storage container being in the first position, the plurality of storage containers are in a stacked arrangement in which the second storage container supports the first storage container. And based on the first storage container being in the second position, the plurality of storage containers are in a seated arrangement in which (i) the first storage container is positioned relative to the second storage container and configured to sit on a passenger seat in an aircraft and (ii) the second storage container is configured to abut or sit adjacent to the passenger seat.

In another example, a method is described. The method includes moving a cargo system to a location adjacent to a passenger seat in an aircraft, where the cargo system comprises a plurality of storage containers comprising a first storage container operably connected to a second storage container via at least one connector, where the at least one connector is configured to allow relative movement of the first storage container to the second storage container between a first position and a second position, where the cargo system is moved to the location while the first storage container is in the first position, and where based on the first storage container being in the first position, the plurality of storage containers are in a stacked arrangement in which the second storage container supports the first storage container. The method also includes, at the location, moving the first storage container to the second position, where based on the first storage container being in the second position, the plurality of storage containers are in a seated arrangement in which (i) the first storage container is positioned relative to the second storage container and configured to sit on a passenger seat in an aircraft and (ii) the second storage container is configured to abut or sit adjacent to the passenger seat.

In another example, a cargo system for storage in a seating area of an aircraft is described. The cargo system includes a single storage container comprising a first storage section, a second storage section, and at least one connector configured to allow relative movement of the first storage section to the second storage section between a first position and a second position, where: based on the first storage section being in the first position, the single storage container is in a stacked arrangement in which the second storage section supports the first storage section, and based on the first storage section being in the second position, the single storage container is in a seated arrangement in which (i) the first storage section is positioned relative to the second storage section and configured to sit on a passenger seat in an aircraft and (ii) the second storage section is configured to abut or sit adjacent to the passenger seat.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 7 shows a flowchart of a method, according to an example implementation.

DETAILED DESCRIPTION

Figure 2:
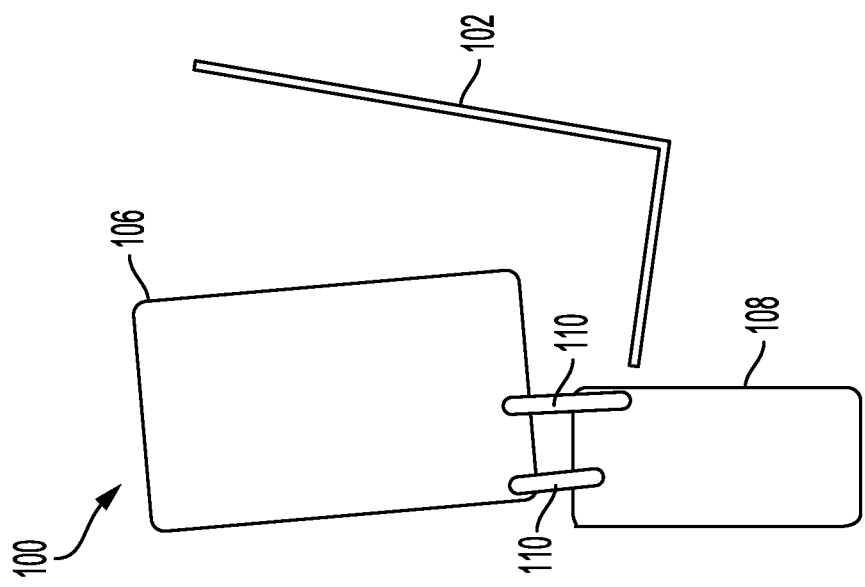
FIG. 2 depicts another side view of the cargo system of FIG. 1, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Unless otherwise specifically noted, elements depicted in the drawings are not necessarily drawn to scale.

Within examples, described herein is a cargo system, particularly a cargo system that is configured to be stored in a seating area of an aircraft, such as on a passenger seat. The disclosed cargo system includes multiple cargo containers operably coupled together via at least one connector. At least one such container is movable (e.g., pivotable via at least one connector) between a first position in which the containers are in a stacked arrangement to a second position in which the containers are in a seated arrangement—for instance, where one such container is seated on a passenger seat and another such container is abutting or adjacent to the passenger seat at a location on the ground, occupying the space where a passenger's legs would typically be. As such, the cargo system can be moved (e.g., lifted or rolled) onto and within an aircraft, to an empty passenger seat, after which that container can be moved from the first position to the second position. Then, after the aircraft has landed, the container can be moved back to the first position and the cargo system can be removed from the aircraft.

The disclosed cargo system provides various advantages. For example, the cargo system enables aircraft operators to, flexibly and with little to no notice, fill unused seats on an aircraft with containerized revenue freight. Such operators can confidently expand services to serve more communities and/or increase frequency and quality of service. Further, the disclosed cargo containers can be configured to hold a similar weight as a full-size passenger and be maneuvered (possibly with the assistance of additional support equipment) and belted or otherwise secured into various types of seats in an aircraft, particularly on smaller aircraft typical of regional operations that often lack significant belly cargo capacity. Still further, the disclosed cargo system is safe and ergonomic, and can facilitate loading and securing of heavy cargo onto an aircraft without as much lifting required from human operators.

These and other improvements are described in more detail below. Implementations described below are for purposes of example. The implementations described below, as well as other implementations, may provide other improvements as well.

Referring now to the figures, FIGS. 1, 2, 3, and 4 each depict a side view of an example of a cargo system 100 for storage in a seating area of an aircraft (not shown), and more particularly depict the cargo system 100 in a respective configuration/position relative to a passenger seat 102 in the aircraft.

The cargo system 100 includes a plurality of storage containers 104. The plurality of storage containers 104 includes a first storage container 106 operably connected to a second storage container 108 via at least one connector 110. As a representative example, the plurality of storage containers 104 of FIGS. 1-4 includes two storage containers, although more or less storage containers are possible in other embodiments.

In other example embodiments, the plurality of storage containers 104 includes more storage containers, and/or one or more of the plurality of storage containers 104 includes two or more sub-containers that are operably coupled to each other. As an example of the latter embodiment, FIG. 1 includes a dashed line and brackets to illustrate how the first storage container 106 could be divided into multiple sub-containers—namely, a first sub-container 112 and a second sub-container 114. Each such sub-container can be configured such that it is liftable by a human operator. Such a configuration might be advantageous in scenarios where it is difficult or impossible to fit the cargo system 100 through a doorway of an aircraft. As such, containers can be broken down into smaller containers to move the cargo system 100 through the doorway and then reassembled when it is time to load the cargo system 100 in the passenger seat 102.

Furthermore, in the representative example of FIGS. 1-4, the at least one connector 110 includes at least two mechanical linkages each having one end pivotably connected to the first storage container 106 and an opposite end pivotably connected to the second storage container 108. Only two such linkages are shown in the side view of FIGS. 1-4, though it should be understood that on an opposite side of the cargo system 100, there could be at least one similar linkage operably coupling the first storage container 106 to the second storage container 108.

As so arranged, the at least one connector 110 is configured to allow relative movement of the first storage container 106 to the second storage container 108 between a first position and a second position.

Figure 1:
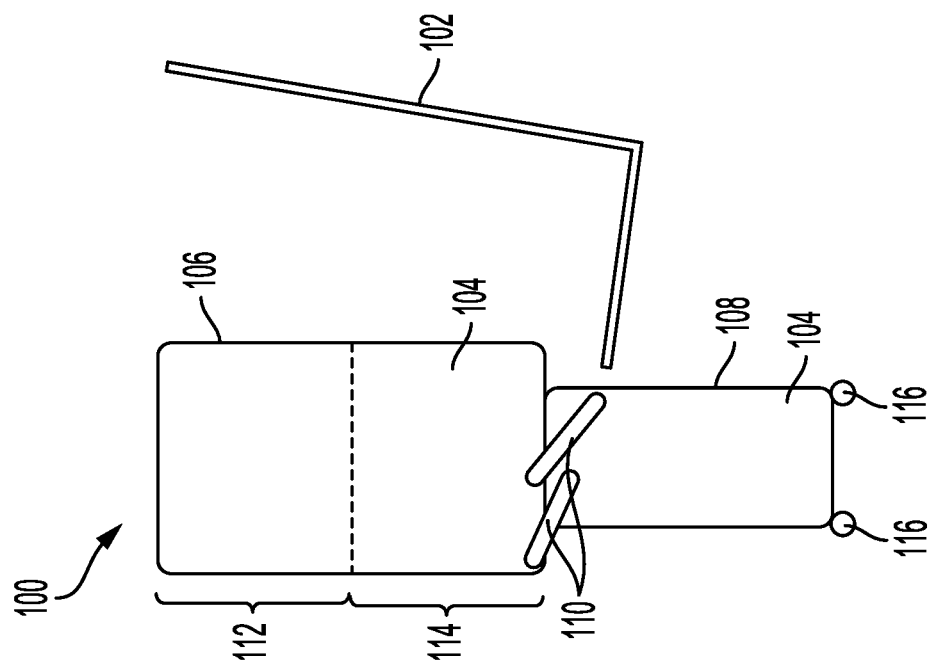
FIG. 1 depicts a side view of an example of a cargo system relative to a passenger seat on an aircraft, according to an example implementation.

FIG. 1 depicts the first storage container 106 in the first position. As shown in FIG. 1, based on the first storage container 106 being in the first position, the plurality of storage containers 104 are in a stacked arrangement in which the second storage container 108 supports the first storage container 106.

Although the first position will be described herein as being associated with the storage containers in a stacked arrangement, in contrast to the second position in which the storage containers are in the seated arrangement, it should be understood that other, non-seated arrangements are possible and can be associated with the first position alternatively to a stacked arrangement. That is, a non-seated arrangement might not have the storage containers stacked on each other, but rather positioned in a different way relative to each other, such as side-by-side, for instance.

In some embodiments, the cargo system 100 includes at least one wheel or other mechanism that helps move the cargo system 100 around, particularly in aisles of the aircraft (e.g., especially in longer jets), in airports, or elsewhere. As an example, as shown in FIG. 1, the cargo system 100 includes wheels 116 attached to an underside of the second storage container 108. In some cases, the cargo system 100 includes multiple 360-degree caster wheels (e.g., four wheels, each attached to a respective one of four corners of the underside of the second storage container 108). In other cases, the cargo system 100 includes four multiple 360-degree caster wheels, each attached to a respective one of the four corners of the underside of the second storage container 108, and also includes one or more intermediate wheels between one or more pairs of the four corners. Any one of the aforementioned wheels (corner wheels and intermediate wheels) can be 360-degree caster wheel or another type of wheel (e.g., 90-degree wheels or wheels that are fixed in at least some manner).

FIG. 2 depicts the first storage container 106 in a respective intermediate position between the first position and the second position, as the first storage container 106 is being moved from the first position to the second position. As shown, the linkages of the at least one connector 110 rotate as the first storage container 106 is moved.

Figure 3:
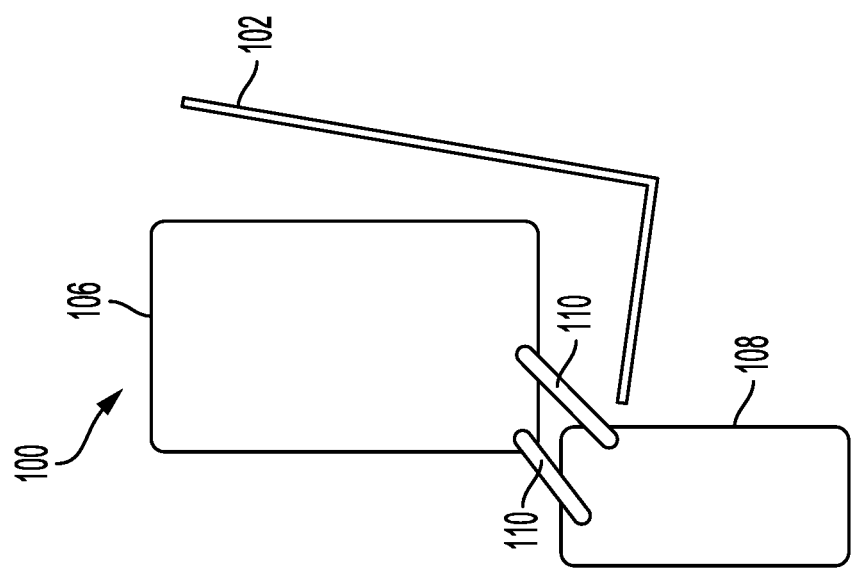
FIG. 3 depicts another side view of the cargo system of FIG. 1, according to an example implementation.

FIG. 3 depicts the first storage container 106 in another respective intermediate position between the first position and the second position, as the first storage container 106 is being moved from the first position to the second position and is closer to the second position than in the intermediate position shown in FIG. 2. As shown, the linkages of the at least one connector 110 continue to rotate as the first storage container 106 is moved.

In alternative embodiments, the at least one connector 110 includes at least one track via which the first storage container 106 is slidable relative to the second storage container 108 between the first position and the second position. Other mechanisms are possible as well for connecting the storage containers of the cargo system 100, additionally or alternatively to those described herein.

Figure 4:
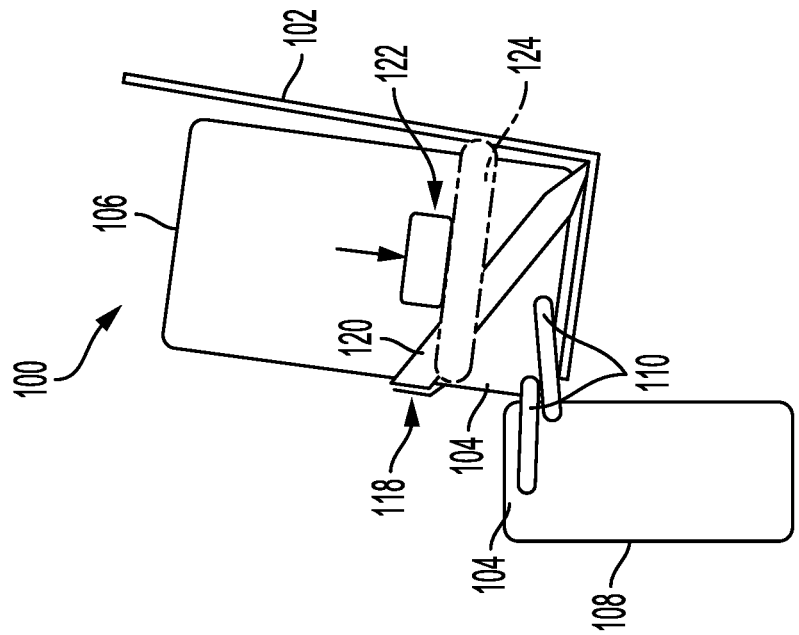
FIG. 4 depicts another side view of the cargo system of FIG. 1, according to an example implementation.

FIG. 4 depicts the first storage container 106 in the second position. As shown in FIG. 4, based on the first storage container 106 being in the second position, the plurality of storage containers 104 are in a seated arrangement in which (i) the first storage container 106 is positioned relative to the second storage container 108 and configured to sit on a passenger seat 102 in an aircraft and (ii) the second storage container 108 is configured to abut or sit adjacent to the passenger seat 102.

Within examples, the cargo system 100 includes one or more components that can help secure the cargo system 100 in the passenger seat 102 and/or one or more components that can help maneuver the cargo system 100 within or outside of the aircraft. For example, as shown in FIG. 4, the first storage container 106 includes at least one hook 118 configured to receive a seatbelt 120 of the passenger seat 102 and secure the first storage container 106 against the passenger seat 102.

As another example, the first storage container 106 comprises a plurality of protruding members (e.g., protruding member 122, as further shown in FIG. 4) configured to rest on or attach to at least one armrest 124 of the passenger seat 102. In some cases, such a protruding member can include a recess, latch, or other mechanism that enables the protruding member to be pushed down (e.g., in the direction shown by the arrow in FIG. 4) and securely attached to the at least one armrest 124. In some situations, such protruding members can also be configured to rest on or attach to an armrest that is built into a door, sidewall of the fuselage of the aircraft, or a grab handle.

As yet another example, at least one of the first storage container 106 or the second storage container 108 includes a plurality of eyes (not shown) configured to receive a plurality of corresponding hooks of a lifting device (not shown) that is configured to move the cargo system 100 within or outside of the aircraft.

As yet another example, at least one of the first storage container 106 or the second storage container 108 includes at least one slot, each configured to receive a single fork of a forklift or other lifting device that is configured to move the cargo system 100 within or outside of the aircraft. In some cases, each slot can include a lockable roller such that the cargo system 100 can be moved off a forklift and onto the aircraft without the forklift having to go fully inside the aircraft.

As yet another example, at least one of the first storage container 106 or the second storage container 108 includes a plurality of wheels (not shown), other than those located on the underside of the cargo system 100 or the second storage container 108. The plurality of wheels are configured to roll along a plurality of corresponding tracks (not shown), so as to move the cargo system 100 within or outside of the aircraft, such as on tracks at a sorting facility.

And as yet another example, at least one of the first storage container 106 or the second storage container 108 includes a plurality of handles (not shown) (e.g., protruding handles or recess in the storage container(s) that function as handles) that can be used by a human operator or lifting device to lift at least a portion of the cargo system 100 within or outside of the aircraft.

The first storage container 106 has a first outer housing defining a first storage volume within, and the second storage container 108 has a second outer housing defining a second storage volume within. Within examples, the first storage volume is larger than the second storage volume. Within other examples, the first outer housing and/or the second outer housing has rigid walls, such as walls made of plastic or metal. Alternatively, within other examples, the first outer housing and/or the second outer housing have a rigid frame (e.g., a steel frame or other frame-like structure) and walls made of a flexible material (e.g., a thick, protective canvas).

Moreover, as an alternative to having two or more storage containers, the cargo system 100 can take the form of a single storage container that is divided into two sections, such as a flexible canvas storage container having two sections—a first section that is configured to sit on the passenger seat 102, and a second section that is configured to sit on the ground in front of the passenger seat 102 (i.e., where a passenger's legs would be). In such an embodiment, the at least one connector 110 can be a portion of the flexible canvas of the single storage container that makes up the exterior of the single storage container. An example of this alternative embodiment is described with respect to FIGS. 5 and 6.

Figure 5:
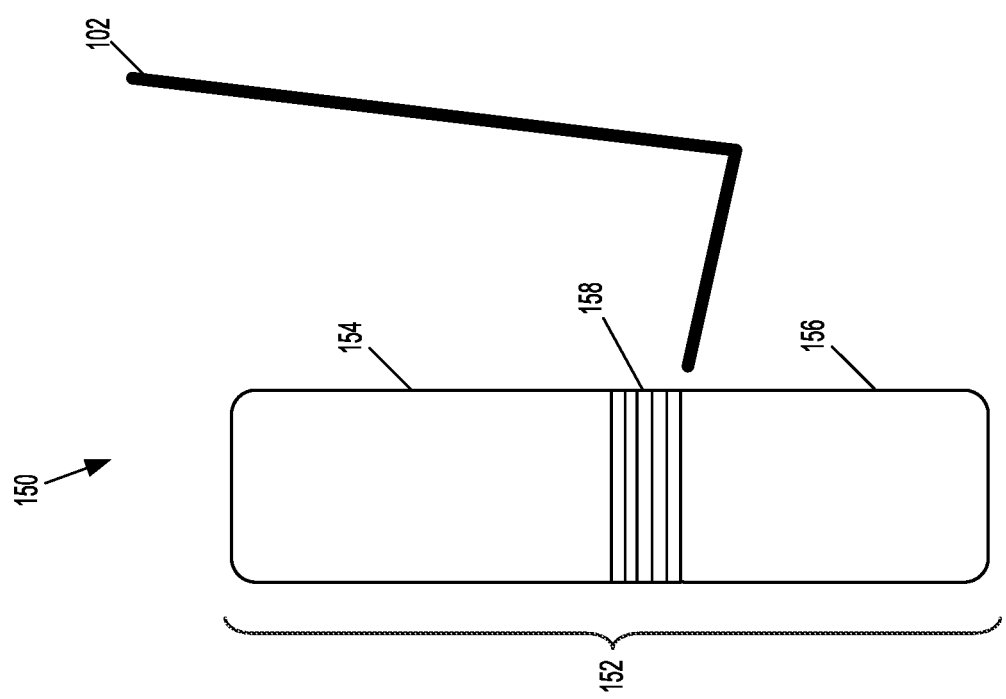
FIG. 5 depicts a side view of an example of a second cargo system relative to a passenger seat on an aircraft, according to an example implementation.

FIG. 5 depicts a side view of a second cargo system 150 relative to the passenger seat 102, according to an example implementation. The second cargo system 150 includes a single storage container 152 having a first storage section 154, a second storage section 156, and at least one connector 158 configured to allow relative movement of the first storage section 154 to the second storage section 156 between a first position and a second position.

In particular, FIG. 5 depicts the first storage section 154 in the first position. Based on the first storage section 154 being in the first position, the single storage container 152 is in a stacked arrangement in which the second storage section 156 supports the first storage section 154.

Figure 6:
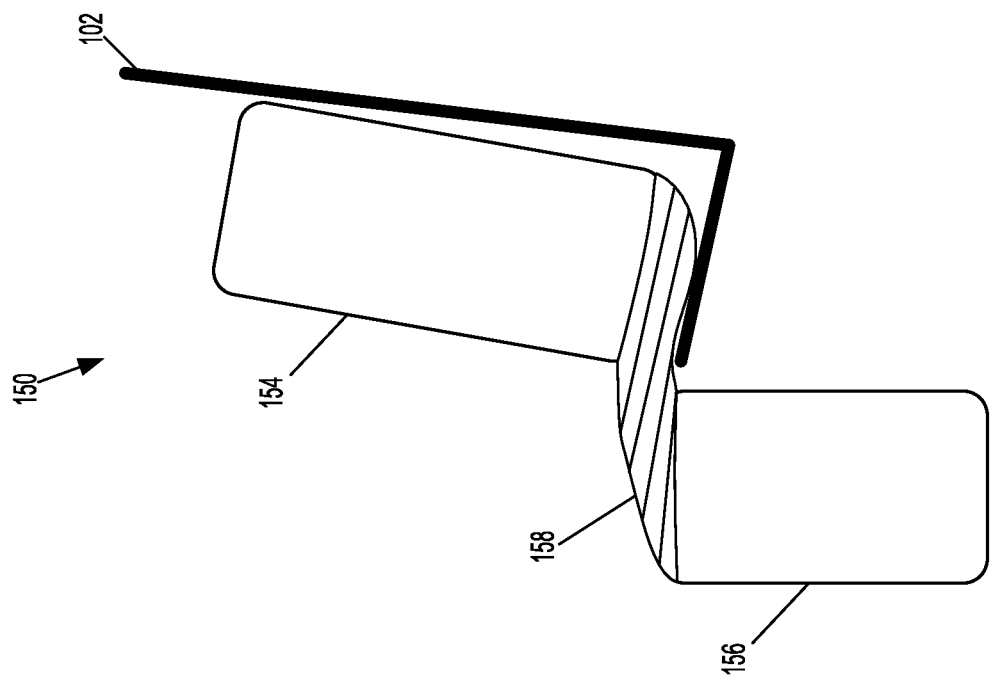
FIG. 6 depicts another side view of the second cargo system of FIG. 5, according to an example implementation.

FIG. 6 next depicts a side view of the second cargo system 150 relative to the passenger seat 102, particularly where the first storage section 154 is in the second position. Based on the first storage section 154 being in the second position, the single storage container 152 is in a seated arrangement in which (i) the first storage section 154 is positioned relative to the second storage section 156 and configured to sit on the passenger seat 102 and (ii) the second storage section 156 is configured to abut or sit adjacent to the passenger seat 102.

Within examples, the single storage container 152 defines a single, contiguous volume therewithin that includes the first storage section 154, the second storage section 156, and a volume within the single storage container 152 defined by the at least one connector 158. That is, within examples, there are no physical borders or barriers separating the first storage section 154 volume from the second storage section 156 volume.

Within examples, the exterior walls of the single storage container 152 are made up of a flexible canvas and the at least one connector 158 is or includes a portion of the flexible canvas.

FIG. 7 shows a flowchart of a method 200, according to an example implementation. Method 200 could be used with the cargo system 100 and components thereof shown in FIGS. 1-4. Method 200 may include one or more operations, functions, or actions as illustrated by one or more of blocks 202-204.

At block 202, the method 200 includes moving a cargo system to a location adjacent to a passenger seat in an aircraft, where the cargo system comprises a plurality of storage containers comprising a first storage container operably connected to a second storage container via at least one connector, where the at least one connector is configured to allow relative movement of the first storage container to the second storage container between a first position and a second position, where the cargo system is moved to the location while the first storage container is in the first position, and where based on the first storage container being in the first position, the plurality of storage containers are in a stacked arrangement in which the second storage container supports the first storage container.

At block 204, the method 200 includes at the location, moving the first storage container to the second position, wherein based on the first storage container being in the second position, the plurality of storage containers are in a seated arrangement in which (i) the first storage container is positioned relative to the second storage container and configured to sit on a passenger seat in an aircraft and (ii) the second storage container is configured to abut or sit adjacent to the passenger seat.

In some embodiments, the first storage container includes a plurality of protruding members, and the method 200 also includes while the cargo system is at the location and the first storage container is in the second position, resting the plurality of protruding members on, or attaching the plurality of protruding members to, one or more of at least one armrest of the passenger seat, at least one armrest built into a door of the aircraft, a fuselage sidewall of the aircraft, or a grab handle.

In some embodiments, the first storage container includes at least one hook configured to receive a seatbelt of the passenger seat, and the method 200 also includes while the cargo system is at the location and the first storage container is in the second position, securing the first storage container against the passenger seat with the seatbelt.

In some embodiments, at least one of the first storage container or the second storage container comprises a plurality of eyes, and the moving of block 202 includes inserting a plurality of hooks of a lifting device into the plurality of eyes and moving the cargo system to the location adjacent to the passenger seat using the lifting device.

In some embodiments, at least one of the first storage container or the second storage container comprises a plurality of wheels, and the moving of block 202 includes rolling the cargo system along a plurality of corresponding tracks, so as to move the cargo system within the aircraft to the location.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A cargo system for storage in a seating area of an aircraft, the cargo system comprising:
 a plurality of storage containers comprising a first storage container operably connected to a second storage container via at least one connector, wherein:
  the at least one connector is configured to allow relative movement of the first storage container to the second storage container between a first position and a second position,
  based on the first storage container being in the first position, the plurality of storage containers are in a stacked arrangement in which the second storage container supports the first storage container, and
  based on the first storage container being in the second position, the plurality of storage containers are in a seated arrangement in which (i) the first storage container is positioned relative to the second storage container and configured to sit on a passenger seat in an aircraft and (ii) the second storage container is configured to abut or sit adjacent to the passenger seat.

2. The cargo system of claim 1, wherein the at least one connector comprises at least one track via which the first storage container is slidable relative to the second storage container between the first position and the second position.

3. The cargo system of claim 1, wherein the at least one connector comprises at least one linkage pivotably connected to the first storage container and the second storage container.

4. The cargo system of claim 1, wherein the at least one connector comprises canvas extending from the first storage container to the second storage container.

5. The cargo system of claim 1, further comprising at least one wheel coupled to an underside of the second storage container.

6. The cargo system of claim 1, wherein:
 the first storage container comprises a first outer housing defining a first storage volume within,
 the second storage container comprises a second outer housing defining a second storage volume within,
 the first storage volume is larger than the second storage volume.

7. The cargo system of claim 1, wherein:
 the first storage container comprises a first outer housing defining a first storage volume within,
 the second storage container comprises a second outer housing defining a second storage volume within,
 one or more of the first outer housing or the second outer housing comprises rigid walls.

8. The cargo system of claim 1, wherein:
 the first storage container comprises a first outer housing defining a first storage volume within,
 the second storage container comprises a second outer housing defining a second storage volume within,
 one or more of the first outer housing or the second outer housing comprises a rigid frame and walls made of a flexible material.

9. The cargo system of claim 1, wherein the first storage container comprises a plurality of protruding members configured to rest on or attach to one or more of at least one armrest of the passenger seat, at least one armrest built into a door of the aircraft, a fuselage sidewall of the aircraft, or a grab handle.

10. The cargo system of claim 1, wherein the first storage container comprises at least one hook configured to receive a seatbelt of the passenger seat and secure the first storage container against the passenger seat.

11. The cargo system of claim 1, wherein at least one of the first storage container or the second storage container comprises a plurality of eyes configured to receive a plurality of corresponding hooks of a lifting device configured to move the cargo system within the aircraft.

12. The cargo system of claim 1, wherein at least one of the first storage container or the second storage container comprises a plurality of wheels configured to roll along a plurality of corresponding tracks, so as to move the cargo system within the aircraft.

13. The cargo system of claim 1, wherein at least one of the first storage container or the second storage container comprises a plurality of handles.

14. A method comprising:
moving a cargo system to a location adjacent to a passenger seat in an aircraft, wherein the cargo system comprises a plurality of storage containers comprising a first storage container operably connected to a second storage container via at least one connector, wherein the at least one connector is configured to allow relative movement of the first storage container to the second storage container between a first position and a second position, wherein the cargo system is moved to the location while the first storage container is in the first position, and wherein based on the first storage container being in the first position, the plurality of storage containers are in a stacked arrangement in which the second storage container supports the first storage container; and
at the location, moving the first storage container to the second position, wherein based on the first storage container being in the second position, the plurality of storage containers are in a seated arrangement in which (i) the first storage container is positioned relative to the second storage container and configured to sit on a passenger seat in an aircraft and (ii) the second storage container is configured to abut or sit adjacent to the passenger seat.

15. The method of claim 14 wherein:
the first storage container comprises a plurality of protruding members, and the method further comprises:
while the cargo system is at the location and the first storage container is in the second position, resting the plurality of protruding members on, or attaching the plurality of protruding members to, one or more of at least one armrest of the passenger seat, at least one armrest built into a door of the aircraft, a fuselage sidewall of the aircraft, or a grab handle.

16. The method of claim 14, wherein:
the first storage container comprises at least one hook configured to receive a seatbelt of the passenger seat, and
the method further comprises:
while the cargo system is at the location and the first storage container is in the second position, securing the first storage container against the passenger seat with the seatbelt.

17. The method of claim 14, wherein:
at least one of the first storage container or the second storage container comprises a plurality of eyes, and
moving the cargo system to the location adjacent to the passenger seat in the aircraft comprises:
inserting a plurality of hooks of a lifting device into the plurality of eyes, and
moving the cargo system to the location adjacent to the passenger seat using the lifting device.

18. The method of claim 14, wherein:
at least one of the first storage container or the second storage container comprises a plurality of wheels, and
moving the cargo system to the location adjacent to the passenger seat in the aircraft comprises rolling the cargo system along a plurality of corresponding tracks, so as to move the cargo system within the aircraft to the location.

19. A cargo system for storage in a seating area of an aircraft, the cargo system comprising:
a single storage container comprising a first storage section, a second storage section, and at least one connector configured to allow relative movement of the first storage section to the second storage section between a first position and a second position, wherein:
based on the first storage section being in the first position, the single storage container is in a stacked arrangement in which the second storage section supports the first storage section, and
based on the first storage section being in the second position, the single storage container is in a seated arrangement in which (i) the first storage section is positioned relative to the second storage section and configured to sit on a passenger seat in an aircraft and (ii) the second storage section is configured to abut or sit adjacent to the passenger seat.

20. The cargo system of claim 19, wherein:
exterior walls of the single storage container are made up of a flexible canvas, and the at least one connector comprises a portion of the flexible canvas.

* * * * *